(12) United States Patent
Vaseloff et al.

(10) Patent No.: US 7,132,926 B2
(45) Date of Patent: Nov. 7, 2006

(54) SMART TRAY SYSTEM AND METHOD FOR RESTAURANT INVENTORY MANAGEMENT

(75) Inventors: Dennis John Vaseloff, Gurnee, IL (US); Loren Jay Veltrop, Deerfield, IL (US)

(73) Assignee: Prince Castle, Inc., Carol Stream, IL (US)

( * ) Notice: Subject to any disclaimer, the term of this patent is extended or adjusted under 35 U.S.C. 154(b) by 109 days.

(21) Appl. No.: 10/809,615

(22) Filed: Mar. 25, 2004

(65) Prior Publication Data

US 2005/0211775 A1 Sep. 29, 2005

(51) Int. Cl.
  *G05B 19/00* (2006.01)
(52) U.S. Cl. .............. 340/5.92; 340/573.1; 340/572.1; 235/385
(58) Field of Classification Search ............. 340/573.1, 340/5.92, 568.1, 572.1, 539.1; 235/385, 235/383; 705/28, 26
See application file for complete search history.

(56) References Cited

U.S. PATENT DOCUMENTS

| | | | |
|---|---|---|---|
| 4,388,689 A | 6/1983 | Hayman et al. | 364/401 |
| 4,530,067 A | 7/1985 | Dorr | 364/900 |
| 4,547,851 A | 10/1985 | Kurland | 705/15 |
| 4,553,222 A | 11/1985 | Kurland et al. | 705/15 |
| 4,569,421 A | 2/1986 | Sandstedt | 186/39 |
| 4,922,435 A | 5/1990 | Cahlander et al. | 364/477 |
| 5,003,472 A | 3/1991 | Perrill et al. | 364/401 |
| 5,093,556 A | 3/1992 | Oelfke | 219/386 |
| 5,128,862 A | 7/1992 | Mueller | 364/405 |
| 5,132,914 A | 7/1992 | Cahlander et al. | 364/478 |
| 5,172,328 A | 12/1992 | Cahlander et al. | 364/478 |
| 5,188,020 A | 2/1993 | Buchnag | 99/468 |
| 5,218,527 A | 6/1993 | Ishikawa et al. | 364/405 |
| 5,253,564 A | 10/1993 | Rosenbrock et al. | 99/328 |
| 5,357,426 A | 10/1994 | Morita et al. | 364/400 |
| 5,504,589 A | 4/1996 | Montague et al. | 358/403 |
| 5,510,979 A | 4/1996 | Moderi et al. | 364/405 |
| 5,539,671 A | 7/1996 | Albrecht et al. | 364/557 |
| 5,553,312 A | 9/1996 | Gattey et al. | 455/11.1 |
| 5,579,952 A | 12/1996 | Fiedler et al. | 221/150 |
| 5,590,586 A | 1/1997 | Ulfig et al. | 99/339 |
| 5,602,730 A | 2/1997 | Coleman et al. | 705/15 |
| 5,616,269 A | 4/1997 | Fowler et al. | 219/720 |
| 5,630,070 A | 5/1997 | Dietrich et al. | 705/8 |
| 5,653,906 A | 8/1997 | Fowler et al. | 219/716 |

(Continued)

FOREIGN PATENT DOCUMENTS

GB  2203320  10/1988

(Continued)

OTHER PUBLICATIONS

Derwent-Acc-No. 1989-001797.

(Continued)

*Primary Examiner*—Anh V. La
(74) *Attorney, Agent, or Firm*—Marshall Gerstein & Borun LLP

(57) ABSTRACT

A smart tray system includes a plurality of information tags and a plurality of communication devices, which can communicate with each of the information tags when the information tags are located in the proximity of the communication devices. Each information tag is attached to a food tray and contains information about the food tray and the food product contained therein. The information tags and the communication devices provide for tracking and updating the information about the food product contained in the food trays.

32 Claims, 4 Drawing Sheets

U.S. PATENT DOCUMENTS

| | | | |
|---|---|---|---|
| 5,712,958 A | 1/1998 | Landolt | 706/3 |
| 5,724,886 A | 3/1998 | Ewald et al. | 99/374 |
| 5,772,072 A | 6/1998 | Prescott et al. | 221/121 |
| 5,812,393 A | 9/1998 | Drucker | 364/144 |
| 5,832,446 A | 11/1998 | Neuhaus | 705/1 |
| 5,839,115 A | 11/1998 | Coleman | 705/15 |
| 5,845,263 A | 12/1998 | Camaisa et al. | 705/27 |
| 5,939,974 A | 8/1999 | Heagle et al. | 340/286.09 |
| 5,947,012 A | 9/1999 | Ewald et al. | 99/374 |
| 6,011,243 A | 1/2000 | Arnold et al. | 219/506 |
| 6,026,372 A | 2/2000 | Savage | 705/15 |
| 6,052,667 A | 4/2000 | Walker et al. | 705/15 |
| 6,088,681 A | 7/2000 | Coleman et al. | 705/15 |
| 6,119,587 A | 9/2000 | Ewald et al. | 99/374 |
| 6,209,447 B1 | 4/2001 | Ewald et al. | 99/483 |
| 6,445,976 B1 * | 9/2002 | Ostro | 700/226 |
| 6,693,539 B1 * | 2/2004 | Bowers et al. | 340/572.1 |
| 6,959,862 B1 * | 11/2005 | Neumark | 235/385 |
| 6,972,682 B1 * | 12/2005 | Lareau et al. | 340/568.1 |

FOREIGN PATENT DOCUMENTS

| | | |
|---|---|---|
| GB | 2206222 | 12/1988 |
| JP | 58108337 | 6/1983 |
| JP | 02056889 | 2/1990 |
| JP | 06259662 | 9/1994 |
| JP | 07296071 | 11/1995 |
| JP | 8000414 | 1/1996 |
| JP | 10079088 | 3/1998 |
| JP | 11342061 | 12/1999 |

OTHER PUBLICATIONS

Derwent-Acc-No. 1988-288058.
Derwent-Acc-No. 1986-022677.
Derwent-Acc-No. 1976-A8720X.
Merlin II Timers product brochure, 1998.
PCT/WO 01/31533 A1 Mar. 24, 1998.
Taco Bell Steam Table Timer operator's manual, Aug. 19, 1994.

* cited by examiner

SMART TRAY SYSTEM AND METHOD FOR RESTAURANT INVENTORY MANAGEMENT

FIELD OF THE DISCLOSURE

The present disclosure generally relates to food trays used in restaurants, and more particularly, to a smart tray system and method for restaurant inventory management.

BACKGROUND

Success of a fast food restaurant depends on whether the restaurant operator can efficiently manage the food inventory and the processing thereof. Ideally, at any moment during the operation of a restaurant, the inventory levels of all food items in the restaurant at various stages of production (e.g., unprocessed, processed, uncooked, and cooked) should be known for efficient management of the food inventory. In most restaurants, however, the food inventory is typically checked or updated periodically. Excessive inventory checks can be labor intensive and costly. In contrast, too few inventory checks may disrupt the preparation and service of food to customers, because the updated inventory levels may not reflect the actual amounts of food available to be served.

Particularly applicable to fast food restaurants is the criterion that a customer should be served with food as soon as his order is taken. Ideally, if the rate at which a restaurant cooks a food product and the rate at which the food product is sold are equal, the restaurant will have fresh food on hand and ready to serve. In other words, for the ideal fast food restaurant operation, the operator must know how many food products will be sold in the future. Although historical sales data for a food product can be used to predict future rates of sale, the prediction is highly approximate and subject to numerous unpredictable events and variables that the historical data do not reflect. As a result, a restaurant operator must precook a certain number of food products and have the cooked products on hand for immediate service.

Therefore, it would be beneficial to have a system for managing the food inventory of a restaurant during various stages of food production, which may include storage of uncooked food, preparation and processing of uncooked food, cooking of the food, storing the cooked food, relocating the cooked food to various locations in the restaurant, and serving the cooked food to customers.

DETAILED DESCRIPTION

Figure 1:
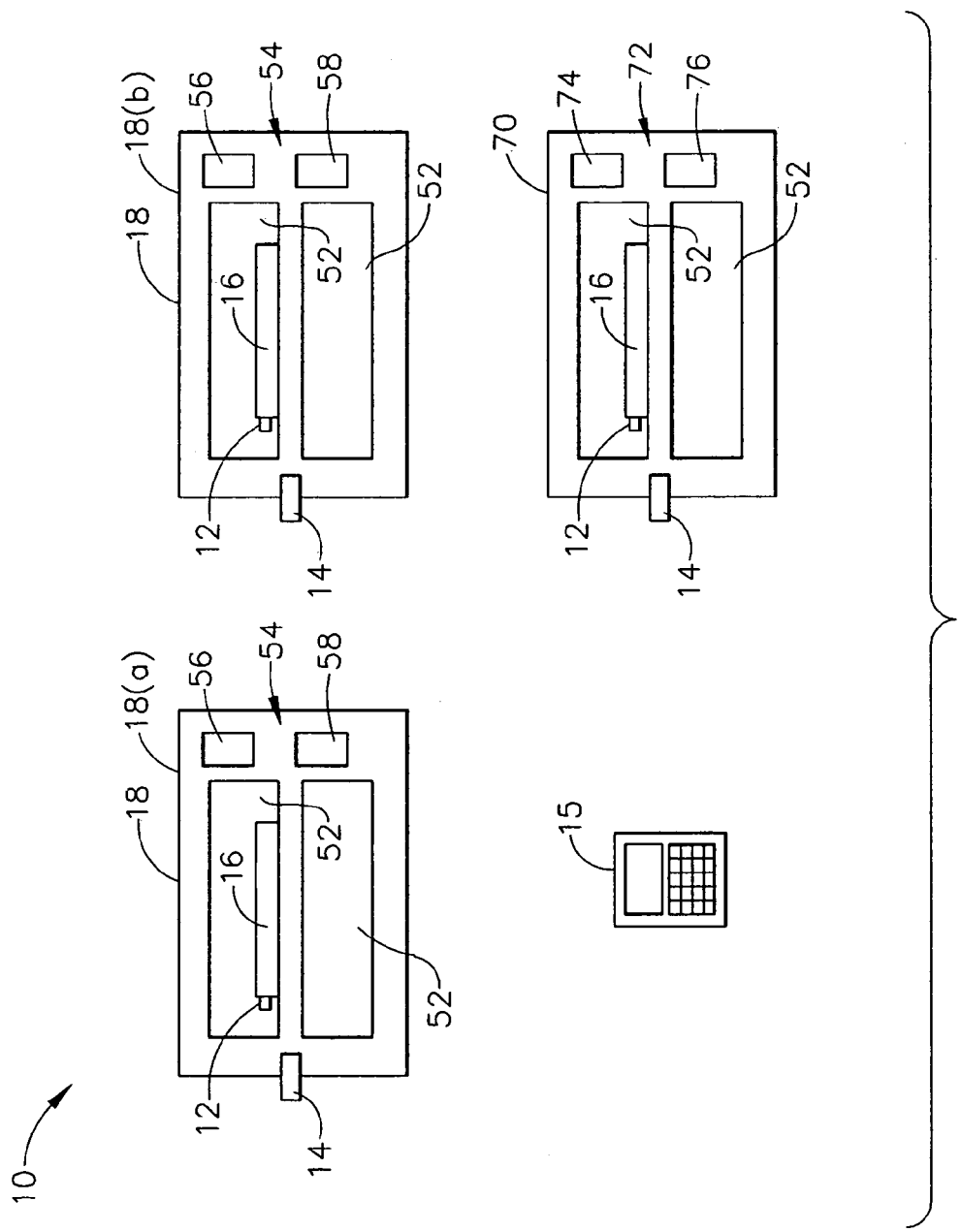
FIG. 1 is a schematic diagram of a first exemplary smart tray system constructed in accordance with the teachings of the present disclosure.
Figure 2:
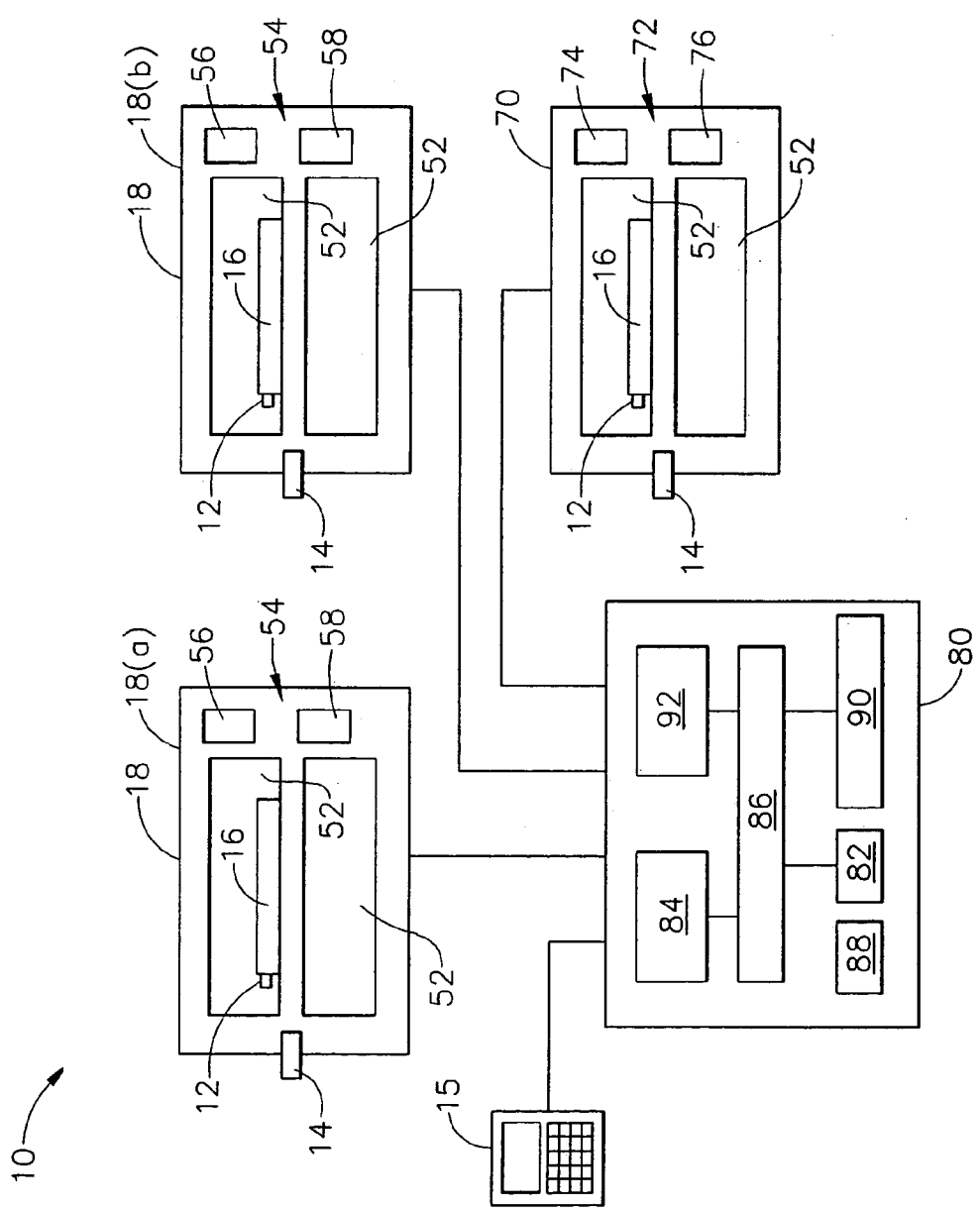
FIG. 2 is a schematic diagram of a second exemplary smart tray system constructed in accordance with the teachings of the present disclosure.

Referring to FIGS. 1 and 2, a smart tray system 10 in accordance with the teachings of the present disclosure is generally shown. The smart tray system 10 includes a plurality of information tags 12 and a plurality of communication devices 14, that can communicate with each of the information tags 12 when the information tags 12 are located in the proximity of the communication device 14. Each information tag 12 is attached to a food tray 16 and can contain information about the food tray 16 and the food items contained therein. One of ordinary skill in the art will readily recognize that the word "tray" is used herein to generally refer to any type of container that can hold a food item and in no way limits the shape, size, or configuration of the food tray 16.

One or more of the communication devices 14 can be disposed on one or more food preparation, processing, and storage devices, which will be referred to in the following discussion generally as food devices 18. Accordingly, a restaurant or food preparation and service facility utilizing the disclosed smart tray system 10 and method can manage the food inventory therein by having current information about food items that are being processed, prepared, and stored in the restaurant. In a first example of the disclosed smart tray system 10 as shown in FIG. 1, the communication devices are not connected and do not communicate directly with each other. In a second example of the disclosed smart tray system 10 as shown in FIG. 2, the communication devices are connected by a network.

Information tags are well known to those of ordinary skill in the art and are used in a wide variety of applications. An information tag can simply be a bar code label that carries information about an item to which it is attached. An information tag can also be a radio frequency tag (RF tag) that not only stores information about an item to which it is attached, but also is read/write capable (i.e., being overwritten with new information). An information tag may also include magnetic or optical storage mediums that are read/write capable. In the disclosed examples, the information tags 12 are RF tags. Accordingly, the information tag 12 will be referred to in the following as the RF tag 12, and the communication device 14 will be referred to in the following as the RF communicator 14. However, one of ordinary skill in the art will appreciate that the disclosed smart tray system 10 and method can use any type of information tag, including those described above, for restaurant inventory management.

Figure 3:
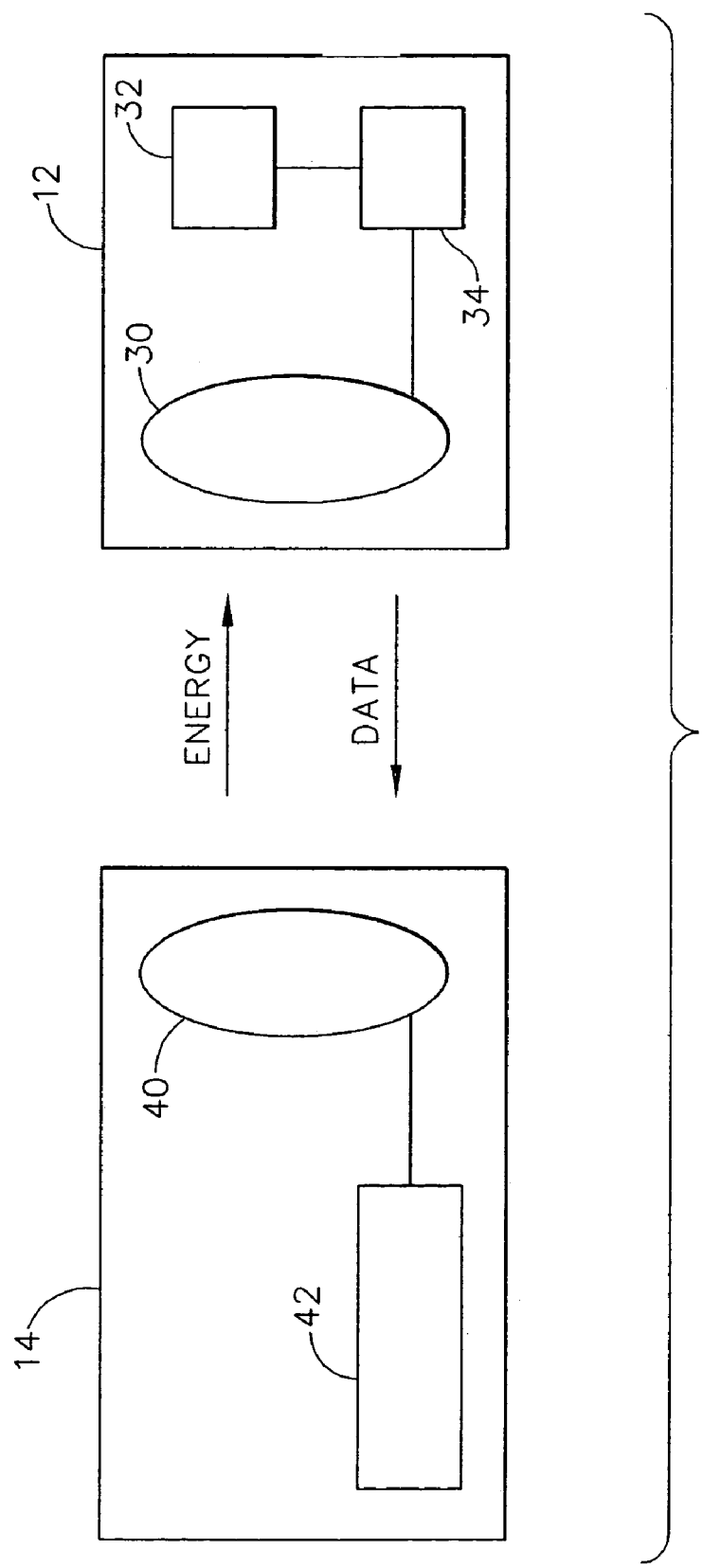
FIG. 3 is a schematic diagram illustrating components of a radio frequency tag and a corresponding radio frequency communication device constructed in accordance with the teachings of the present disclosure.

Referring to FIG. 3, a schematic diagram of the RF tag 12 and the RF communicator 14 is generally shown. RF tag technology is based on bidirectional radio frequency communication between the RF communicator 14 and the RF tag 12. The RF tag 12 includes an antenna 30, control circuitry 34, and memory 32, in which information is stored. The antenna 30 may be a circuit board printed antenna, a coiled antenna, or other antennas that are known to those of ordinary skill in the art. The memory 32 may be read-only, in which case the information stored therein cannot be changed. Alternately, the memory 32 may be read/write capable, in which case the information stored therein can be altered, overwritten or added to by a user. The RF tag 12 may receive the energy to operate from the communicator 14, i.e., a passive RF tag 12. The RF tag 12 may also have an internal power supply (not shown), i.e. an active RF tag 12. Both passive and active RF tags 12 can be used in the disclosed smart tray system 10 and method. Active RF tags typically have a larger range than passive RF tags.

The RF communicator 14 includes an antenna 40 and modulation/demodulation circuits 42. As will become apparent in the following, a microprocessor (not sown in FIG. 3) controls the modulation/demodulation circuits 42. The RF communicator 14 emits an electromagnetic field when operating that extends in a range about the antenna 40. If the RF tag 12 passes within the range, the electromagnetic field of the communicator activates the control circuitry 32 of the RF tag 12 through the antenna 30 by either inductive coupling or capacitive coupling. A dialog is then established between the RF tag 12 and the RF communicator 14. The dialog may initially involve the RF tag 12 identifying itself by sending the information contained in the memory 34 to the communicator 14.

The information from the RF communicator 14 may forward the information it receives to a processor that may be in the RF communicator 14. However, as will be described in the following, the smart tray system 10 may include one or more computing devices having processors for analyzing, organizing, and managing the information from the RF communicators 14 that are used in the smart tray system 10. Furthermore, as will be described in the following, the smart tray system 10 may include a centralized computing device for forming a database of information about each RF tag 12 and the operations thereof. Accordingly, the centralized computing device can receive, analyze, organize and manage the information from the RF communicators 14 and other devices of the smart tray system 10 based on the various operations of each RF tag 12 that are recorded in the database.

Figure 4:
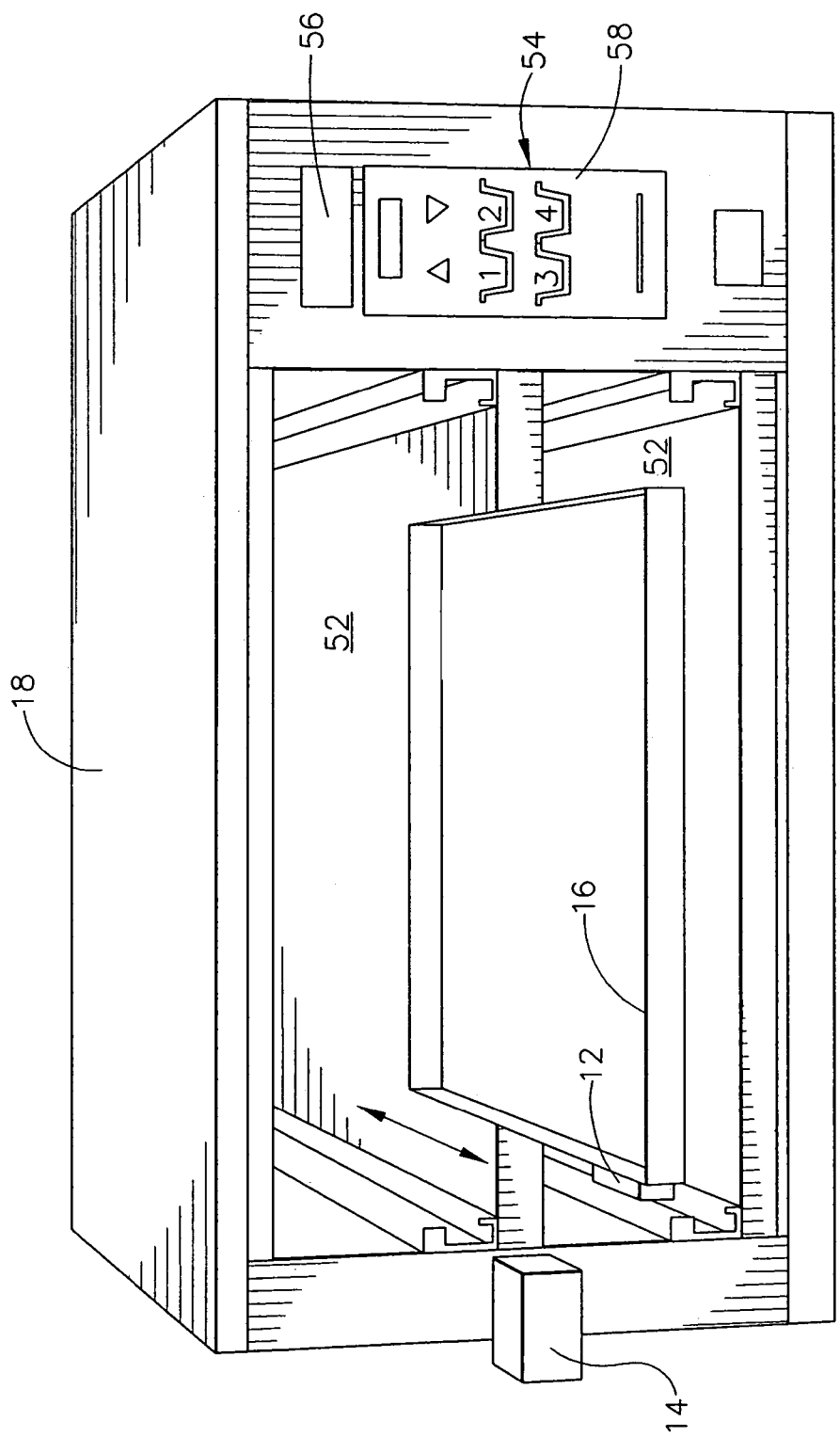
FIG. 4 is a perspective view of an exemplary food device and a smart tray constructed in accordance with the teachings of the present disclosure.

Referring to FIG. 4, an exemplary food device 18 is shown. The food device 18 illustrates the various types of food preparation, processing, and storage devices that may be found in a typical restaurant. For example, the food device 18 may be a food refrigeration device, a food processor, a mixer, a fryer, a grill, a food warming cabinet, or other food preparation, processing, and storage devices that can be found in a restaurant. Each food device 18 can include one or more slots 52 for receiving food trays 16, and may include a user interface 54. The user interface 54 may include an output device such as a display 56 for displaying various operational parameters of the food device 18, and may also include a control panel 58.

Each food device 18 includes at least one RF communicator 14 positioned so as to communicate with the RF tag 12 on each food tray 16 that may be placed in one of the slots 52. The RF communicator 14 may be integral with each food device 18 (not shown). Alternately, an RF communicator 14 can be mounted on a front face of the food device 18 (shown in FIGS. 1 and 2). The mounting of the RF communicator 14 on a food device 18 is particularly useful when retrofitting existing food devices 18 for use with a smart tray system 10. As the food tray 16 is being inserted in one of the slots 52, the RF tag 12 of the food tray 16 enters the range of the RF communicator 14, and therefore, a dialog can be established between the RF tag 12 and the RF communicator 14.

Of the noted food devices 18, a food warming cabinet 18 is also described in the following discussion to illustrate the operation of the disclosed smart tray system 10 and method for restaurant inventory management. Additionally, the food devices 18 will be interchangeably referred to in the following as warming cabinets 18 where making such a reference is applicable. However, the disclosed smart tray system 10 and method for restaurant inventory management is equally applicable to food devices other than the exemplary warming cabinet 18.

Food devices 18, such as those noted above, can include one or more RF communicators 14 that communicate with RF tags 12 that are used in or around the food devices. For example, a freezer can include one or more RF communicators 14 for communicating with RF tags 12 that may be placed on food product packaging or storage containers. Accordingly, the RF tag 12 can communicate with the RF communicator 14 information about the food product being stored in the freezer. Thus, one of ordinary skill in the art will readily appreciate from the above example the applicability of the smart tray system 10 of the present disclosure to any type of food device.

The two exemplary smart tray systems 10 that are shown in FIGS. 1 and 2 include one or more warming cabinets 18, at least one RF tag programming device 70, and at least one computing device 80. Returning to FIG. 4, each food warming cabinet 18 includes one or more slots 52 for receiving a food tray 16. Although the slots 52 are shown in FIG. 4 to be rectangular, and with an open end, the slots 52 can be any shape, size, or configuration so as to be able to accept a correspondingly shaped food tray 16, or be able to accept a variety of multiple food tray shapes and sizes. Each slot 52 is configured to perform a warming function, such as thawing, cooking, or just warming of the food items that are in the food tray 16. The user interface 54 allows an operator to set, adjust, and monitor the various functions of the food warming cabinet 18. The warming cabinet 18 is shown to have one RF communicator 14 between the two shown slots 52. However, one or any number of RF communicators 14 can be provided for the warming cabinet 18 and can be placed in any location relative to the warming cabinet 18 as long as the RF tag 12 of each food tray 16 that is placed a slot 52 comes within the range of the RF communicator(s) 14.

The smart tray system 10 can also include one or more portable or handheld RF communicators. The handheld communicator 15 allows a user to get information from any of the RF tags 12 by simply moving the handheld RF communicator 15 to within the range of the antenna 30 of the RF tag 12. In addition to the above-described components of the RF communicator 14, the handheld RF communicator 15 can further include additional components that provide portability and handheld functionality. Accordingly, the handheld RF communicator 15 can include a portable computing device that is known to those of ordinary skill in the art, such as a portable digital assistant (PDA) or a portable computer (e.g., laptop computer, tablet computer, etc.), in which an RF communicator 14 is operatively incorporated. Alternately, the handheld RF communicator 15 can include all the above-described components of the RF communicator 14, plus any number of the following components: a computing device, one or more input/output devices, a display device, a memory, and a communication device that may be capable of wired or wireless communication. In the following description, the functions and operations of the handheld RF communicator 15 will be described in detail whenever applicable.

The RF tag programming device 70 provides programming of each RF tag 12 prior to or during use for a particular food. For example, a food tray 16 that has not been used to hold any food items, or will be used to hold a different food item, can be placed in the food programming device 70, and information about the food tray 16 and the food to be stored therein can be stored on the RF tag 12. The information can include identification information for the food tray 16. Such identification information can be a set of numbers, letters, or other identifying characters that represent a unique property or characteristic of the food tray 16. For example, the identification information for the RF tag 12 can be a multi-digit number with one or more digits indicating information such as the type of food to be stored in the food tray 16, the date, and a numeric identifier for the RF Tag 12 relative to all the operationally available RF Tags 12 in a restaurant (e.g. RF Tag number 4 of 10). Additional information that can be stored on the memory 34 of the RF tag 12 by the programming device 70 may include, for example, the quantity of food items placed in the food tray 16, the storage temperature and storage time limits of the food item, and various other parameters that reflect the characteristics of the food item.

The programming device 70 includes a user interface 72 that includes one or more output devices such as a display 74 and one or more input devices such as control panel 76. The programming device 70 also includes one or more RF communicators 14 for reading information from and writing information to the RF tags 12. The programming device 70 also includes one or more slots 52 for receiving one or more food trays 16, respectively. An operator can place a food tray 16 that includes an RF tag 12 in the programming device 70. Accordingly, the RF tag 12 of the food tray 16 will be disposed in the range of the RF communicators 14 of the programming device 70. The user can then read information from the RF tag 12 or write information to the RF tag 12 with the control panel 76.

As illustrated in FIG. 1, the smart tray system 10 may have only one stand-alone programming device 70. Alternately, each warming cabinet 18 may be internally equipped with a programming device 70. As described in the foregoing, each warming cabinet 18 includes one or more RF communicators 14 and a user interface 54. Accordingly, each warming cabinet 18 can also serve as a programming device 70 if desired. The handheld communicator 15 can also be used to program the RF tags 12. For example, in a smart tray system 10 where each warming cabinet 18 is equipped with a programming device 70, the handheld communicator 15 can communicate with the programming device 70 of each warming cabinet 18 to program an RF tag 12 that is attached to a food tray 16 inside the warming cabinet 18. The communication of the handheld RF communicator 15 with the warming cabinet 18 may be wired or wireless as will be described in further detail below. Alternately, the handheld RF communicator 15 can be used by an operator to directly program an RF tag 12 by being moved within the range of the antenna 30 of the RF tag 12.

The computing device 80 (shown only in FIG. 2) manages various resources of the smart tray system 10 including the information stored on each RF tag 12 and the exchange of such information in the smart tray system 10. As used herein, "computing device" refers to any computing system (e.g., portable computer, laptop computer, PDA, desktop computer, server, etc.) that employs a processor 82 for executing a series of instructions that are stored in a machine-accessible medium. The computing device 80 of the illustrated example may contain one or more conventional hardware components of a typical computer system that is well known to those of ordinary skill in the art. Such components include a data storage device 84, a communications bus 86, a power supply 88, the processor 82, a memory 90, and an input-output controller 92. The computing device 80 also includes an internal timer for tracking the operational time of each RF tag 12. The internal timer may be implemented by hardware, such as quartz timer, or be software driven.

Even though the illustrated example of the computing device 80 shows the components thereof to be internal to the computing device 10, a person of ordinary skill in the art will appreciate that one or more of these components can alternatively be external to the computing device 80. Additionally, although the computing device 80 is shown to be the only such device in the smart tray system 10, a plurality of computing devices 80 can be provided that operate independently or jointly by communicating with each other. For example, each of the food warming cabinet 18 can include a computing device similar to the computing device 80. Alternately, each food warming cabinet 18 can include only one or more components of the computing device 80 (e.g., each of the food devices 18 only including memory 90). For example, each food warming cabinet 18 can include an internal timer to track the time a food tray 16 has been stored therein. In the smart tray system 10 that is illustrated in FIG. 2, a centralized computing device 80 is shown. However, as described in the foregoing, a variety of computing devices 80 and computing device configurations can be used in the disclosed smart tray system 10 that can perform the disclosed functions of the computing device 80.

An exemplary operational scenario of the smart tray system 10 will now be described. As described above, each food tray 16 in the smart tray system 10 includes at least one RF tag 12. An operator can program the RF tag 12 by placing the food tray 16 in the programming device 70. The information that can be stored on the RF tag 12 by the programming device 70 can include, but is not limited to, a numeric identifier, the type of food that is to be placed in the food tray 16, the date, the time, the quantity of the food item, and the characteristics of the food item (i.e., cooking time or for how long the food item can be servable if maintained at particular temperature).

Once the RF tag 12 of the food tray 16 is programmed, the food items can be placed in the food tray 16 and transferred to the warming cabinet 18. The programming of the RF tag 12 can also be performed by the handheld RF communicator 15 either directly communicating with the RF tag 12, or communicating with the warming cabinet 18 after the food tray 16 is placed therein.

For illustrating the operation of the smart tray system 10, the two warming cabinets 18 shown in FIGS. 1 and 2 are labeled with reference numbers 18(*a*) and 18(*b*) and may be referred to in the following with these reference numbers when applicable. However, as described in the foregoing and is well known by those of ordinary skill in the art, various food devices can be used in the smart tray system 10, and the following exemplary operational methods are equally applicable to other types of food devices that are not discussed in detail herein.

The warming cabinets 18 maintain a freshly cooked food item at a temperature that is specific to the food item. By keeping the cooked food item at the specific temperature, the food item can remain in a servable condition, i.e., fresh, for a period of time, which may also be specific to the particular type of food item. Accordingly, a restaurant operator does not have to cook a food item every time an order for the food item is received. The operator can cook a batch of the food items and store them in the warming cabinet 18. When an order is received, it can be immediately filled by using the warm food items stored in the warming cabinet 18. An operator can then keep track of the quantities of warm food items remaining, or the time the food items have been stored in the warming cabinet 18, and cook additional quantities of the food items prior to depleting the warm supply of the food items. An operator can use the control panel 58 of the warming cabinet 18 to record the number of food items that are originally in the food tray 16. During operation, the operator can then use the control panel 58 to update the number of food items based on the number thereof removed from the food tray 16. Accordingly, the smart tray system 10 can keep track of the number of items in a food tray 16 at any given time. Additionally, the smart tray system 10 can be operatively connected to a point-of-sale system in a restaurant. Thus, when a food item is sold, the smart tray system 10 will subtract the number of food items sold from the inventory of the cooked food items.

When the food tray 16 is placed in one of the slots 52 of the warming cabinet 18(a), the RF communicator 14 reads the information on the RF tag 12 of the food tray 16. The warming cabinet 18(a) can then use the information to adjust its operational parameters and conditions in accordance with the type of food item being placed therein. For instance, when the food tray 16 is placed in the slot 52 and the RF communicator 14 reads the information on the RF tag 12, the warming cabinet 18(a) can start the timer of the food device 18(a) of the computing device 80 to keep track of the holding period of the food item, and adjust the temperature of the slot 52 to match the specific warming temperature of the food item. The RF tag 12 may also include a temperature sensor to alert a user when the temperature in the slot 52 of the food device 18(a) falls outside a predetermined range. The information from the RF tag 12 and the adjustments made by the warming cabinet 18(a) can be provided to an operator on the display 56.

The operator can also change the operating parameters and conditions of the warming cabinet with the control panel 58. The operator may also be able to use the handheld RF communicator 15 to change the operating parameters and conditions of the warming cabinet 18(a) or 18(b). If the RF communicator 14 has a large range, it may possibly read information from nearby RF tags 12 that are in adjacent warming cabinets or being transported by an operator. Accordingly, each RF communicator-14 or the entire smart tray system 10 may include various software/hardware implemented methods that are well known to those of ordinary skill in the art for distinguishing between the different RF tags 12. Also, each slot 52 can include a switch that automatically activates the RF communicator 14 when the food tray 16 is placed in the slot 52. Alternately, an operator can activate the RF communicator 14 with the control panel 58.

When the food tray 16 is transferred from warming cabinet 18(a) to warming cabinet 18(b), current information regarding the food items in the food tray 16 must also be transferred. For example, at least the information pertaining to the elapsed holding time of the food items and the type of food item in the food tray 16 can be transferred, so that the warming cabinet 18(b) (i.e., the transferee) can continue the warming of the food items in the food tray 16 where the warming cabinet 18(b) (i.e., the transferor) left off. Additionally, availability of information regarding the current status of all food trays 16 and the food items therein, whether food trays 16 are transferred or not, allows the smart tray system 10 to manage the inventory of all food items in a restaurant where the smart tray system 10 is used.

FIGS. 1 and 2 generally illustrate two exemplary methods that can facilitate the above-described information exchange. In FIG. 1, the food warming cabinet 18 and the programming device 70 do not communicate. Accordingly, each of the warming cabinets 18 and the programming device 70 includes a computing device 80. The smart tray system 10 of FIG. 1 uses the available memory on each RF tag 12 to facilitate the exchange of information. For example, when a user initiates a transfer of a food tray 16 from the warming cabinet 18(a) to the warming cabinet 18(b), the RF communicator 14 of the warming cabinet 18(a) stores all the necessary information for the transfer on the RF tag 12 of the food tray 16. When the food tray 16 is placed in the warming cabinet 18(b), the RF communicator 14 of the warming cabinet 18(b) reads the information from the RF tag 12. Based on the read information, the warming cabinet 18(b) can then operate on the food tray 16 from where the warming cabinet 18(a) left off. Because the food warming cabinet 18, the programming device 70, and the computing device 80 of the smart tray system 10 of FIG. 1 do not communicate with each other, their RF communicators 14 can also write information on the RF tags 12. Such information can then be read from the RF communicator 14 of the programming device 70 to provide the operator with inventory management functions. Additionally, one or more of the handheld RF communicators 15 can be provided with the exemplary smart tray system of FIG. 1 to communicate with and program the RF tags 12.

Referring to FIG. 2, the food warming cabinet 18, the programming device 70, the computing device 80, and the one or more handheld RF communicators 15 communicate with each other by a wired or wireless network, or a combination thereof, that is well known to those of ordinary skill in the art. In FIG. 2, the computing device 80 not only can function as a communications hub, but may also function as a centralized computing device 80. Accordingly, the programming device 70 and the food warming cabinet 18 may not include independent computing devices. Alternately, the food warming cabinet 18 can include independent computing devices that may communicate with the computing device 80. Each of the RF communicators 14 used in the smart tray system 10 of FIG. 2 can communicate with the computing device 80 to receive information from the computing device 80 to be written on the RF tags 12, or send information that was read from the RF tags 12 to the computing device 80. Accordingly, the computing device 80 can accumulate and process the communicated information to provide control of the food warming cabinet 18 and the programming device 70, and to provide inventory management functions. For example, information indicating the number of food items and the rate by which the food items are sold to customers in a restaurant can be processed by the computing device 80 to issue a command to the operator to replenish the food item's inventory.

The computing device 80 includes a database of information that represents the information received from the RF communicators 14, the food devices 18, and the programming device 70. Each RF tag 12 is identified in the database by the aforementioned numerical identifier. Accordingly, the information from each of RF tags 12, which are communicated to the RF communicators 14, can be organized in the database according to the numerical identifiers of the RF tags 12. Furthermore, the computing device 80 can track the operation of each RF tag 12 by knowing its identifier and by referring to the database for past and current information about the various operations of the RF tag 12.

In the smart tray system of FIG. 2, the handheld RF communicator 15 can function independently as described above to communicate with the RF tags 12, program the RF tags 12, and/or change the operational parameters of the food warming cabinet 18. Additionally, the handheld RF communicator 15 can function as a mobile extension of the computing device 80 and communicate with the computing device 80. Accordingly, the handheld RF communicator 15 can communicate and control each of the food warming cabinet 18 and the programming device 70. Any information received from the RF tags 12 by the handheld RF communicator 15 can be communicated to the computing device 80. Furthermore, because the handheld RF communicator 15 is capable of performing a wide range of communication, data storage, and control functions, the historical information accumulated by the handheld RF communicator 15 can be used by the computing device 80 to track and manage food item inventories of the restaurant.

Other well known networking or information exchange configurations for the smart tray system 10 can be used. Such configurations may include variations of the two above-described exemplary smart tray systems 10 or hybrid variations thereof. For instance, the food warming cabinet 18, the programming device 70 and the computing device 80 can be connected in a peer-to-peer manner. Accordingly, one or more of the food warming cabinet 18 and the programming device 70 can include one or more computing devices 80, the resources of which may be shared by the entire smart tray system 10. In yet another example, the food warming cabinet 18 and the programming device 70 can each include computing devices 80 that communicate with a wired or wireless network that is managed by one or more of the handheld RF communicators 15.

One of ordinary skill in the art will appreciate that various inventory management and restaurant operational software can be stored in and executed by the computing device 80 and/or the handheld RF communicator 15 to provide one or more desired methods of inventory management and restaurant operation. Such methods can vary from simple methods of tracking the inventories of a specific food item being prepared in a restaurant, to a method where various information about food items are tracked from the date of delivery to the restaurant until the point of sale. The tracked information can then be used to predict future needs of the restaurant. An example of methods of inventory management and restaurant operation is disclosed in U.S. Reissue patent application Ser. No. 10/077,364, filed Feb. 14, 2002, the contents of which are incorporated by reference herein.

Persons of ordinary skill in the art will appreciate that, although the teachings of the invention have been illustrated in connection with certain embodiments, there is no intent to limit the invention to such embodiments. On the contrary, the intention of this application is to cover all modifications and embodiments fairly falling within the scope of the teachings of the invention.

What is claimed is:

1. A smart tray system comprising:
a plurality of information tags, each information tag adapted to be disposed on a food tray and include information about the food tray and a food product contained therein; and
a plurality of communication devices, each communication device adapted to communicate with the information tags when each information tag is located in proximity of each communication device.

2. The smart tray system of claim 1, wherein the information tags are radio frequency tags.

3. The smart tray system of claim 1, wherein the information tags are data storage devices.

4. The smart tray system of claim 1, wherein the communication devices are adapted to read the information from the information tags and write the information on the information tags.

5. The smart tray system of claim 1, further comprising a plurality of food devices, each food device adapted to receive one or more of the food trays, wherein each food device includes at least one of the communication devices.

6. The smart tray system of claim 5, wherein each food device comprises a computing device adapted to manage the operation of the food device and the at least one of the communication devices included with the food device.

7. The smart tray system of claim 6, wherein the computing device of each food device is adapted to provide communication with other food devices and the communication devices by a communication network.

8. The smart tray system of claim 7, wherein the communication network is a wired communication network.

9. The smart tray system of claim 7, wherein the communication network is a wireless communication network.

10. The smart tray system of claim 1, wherein the plurality of communication devices are adapted to communicate with each other.

11. The smart tray system of claim 1, further comprising at least a programming device adapted to write information on the plurality of information tags.

12. The smart tray system of claim 1, further comprising a mobile communication device adapted to communicate with the information tags.

13. A restaurant inventory management system comprising:
a plurality of information tags, each information tag adapted to be disposed on a food tray and include information about the food tray and a food product contained therein;
a plurality of communication devices, each communication device adapted to communicate with the information tags when each information tag is located in proximity of each communication device; and
at least one computing device operatively coupled to the communication devices and adapted to manage the communication of each of the communication devices with each of the information tags.

14. The restaurant inventory management system of claim 13, wherein the information tags are radio frequency tags.

15. The restaurant inventory management system of claim 13, wherein the information tags are data storage devices.

16. The restaurant inventory management system of claim 13, wherein each communication device is adapted to read information from the information tags and write information on the information tags.

17. The restaurant inventory management system of claim 13, further comprising a plurality of food devices, each food device adapted to receive one or more of the food trays, wherein each food device includes at least one of the communication devices.

18. The restaurant inventory management system of claim 13, wherein the computing device includes inventory management capability.

19. The restaurant inventory management system of claim 17, wherein each food device is operatively coupled to the computing device.

20. The restaurant inventory management system of claim 19, wherein each food device is operatively coupled to the computing device by a wired communication network.

21. The restaurant inventory management system of claim 19, wherein each food device is operatively coupled to the computing device by a wireless communication network.

22. The restaurant inventory management system of claim 13, further comprising at least a programming device for writing information on the information tags.

23. The restaurant inventory management system of claim 13, further comprising a mobile communication device adapted to communicate with the information tags.

24. The restaurant inventory management system of claim 23, wherein the mobile communication device is operatively coupled to the computing device.

25. A method of restaurant inventory management comprising:
storing information about a food product contained in a plurality food trays on information tags, each food tray having at least one information tag disposed thereon;
tracking the information about the food product contained in the food trays during one or more processes on the food product contained in the food trays with a plurality of communication devices adapted to communicate with each information tag when each information tag is located in proximity of each communication device; and
updating the information about the food product contained in the food trays responsive to the tracking of the information during the one or more processes on the food product contained in the food trays.

26. The method of claim 25, wherein the storing of information on the information tags is provided by a programming device having at least one communication device capable of writing information on the information tags.

27. The method of claim 25, wherein the information stored on the information tags includes at least one of an identification information for the food tray on which the information tag is disposed, the type of food product contained in the food tray on which the information tag is disposed, and duration of time for the one or more processes on the food product contained in the food tray on which the information tag is disposed.

28. The method of claim 25, wherein the tracking comprises reading the information on the information tags with the communication devices during the one or more processes on the food product contained in the food trays.

29. The method of claim 25, wherein the one or more processes on the food product contained in the food trays include at least one of storing the uncooked food product, cooking the food product, storing the cooked food product, removing cooked food product from the food trays, adding cooked food product to the food trays, and moving the food trays in which the food product is contained from one location to another location in the restaurant.

30. The method of claim 25, wherein the updating comprises writing information on the information tags with the communication devices responsive to the tracking of the information during the one or more processes on the food product contained in the food trays.

31. The method of claim 25, further comprising processing the information during at least one of the storing, the tracking, and the updating, the processing being performed by at least a computing device, wherein at least one of the storing, the tracking, and the updating is performed with the computing device by the plurality of the communication devices being operationally coupled to the computing device and communicating information with the computing device.

32. The method of claim 31, wherein the processing of the information by the computing device provides restaurant operational and inventory information.

* * * * *

UNITED STATES PATENT AND TRADEMARK OFFICE
CERTIFICATE OF CORRECTION

PATENT NO.         : 7,132,926 B2                              Page 1 of 1
APPLICATION NO. : 10/809615
DATED              : November 7, 2006
INVENTOR(S)        : Dennis J. Vaseloff et al.

It is certified that error appears in the above-identified patent and that said Letters Patent is hereby corrected as shown below:

On the Title Page:

Line (74), "Marshall" should be -- Marshall, --.

In the Claims:

Column 11, line 7, "plurality food" should be -- plurality of food --.

Signed and Sealed this

Twentieth Day of March, 2007

JON W. DUDAS
*Director of the United States Patent and Trademark Office*